United States Patent [19]

Solowiej

[11] Patent Number: 5,177,900
[45] Date of Patent: Jan. 12, 1993

[54] AUTOMATIC PET DOOR

[76] Inventor: Henry E. Solowiej, 10882 Wilson Ave., Alta Loma, Calif. 91701-2437

[21] Appl. No.: 749,425

[22] Filed: Aug. 23, 1991

[51] Int. Cl.⁵ ............................................. E05F 11/12
[52] U.S. Cl. ........................................... 49/363; 49/25
[58] Field of Search .................. 49/363, 360, 168, 169, 49/25; 160/180, 1, 7, 116

[56] References Cited

U.S. PATENT DOCUMENTS

| | | | |
|---|---|---|---|
| 1,583,835 | 5/1926 | Hynes | 49/363 |
| 2,902,276 | 9/1959 | Purdy . | |
| 3,041,507 | 6/1962 | Rose et al. | 49/25 X |
| 3,903,996 | 9/1975 | Berkovitz et al. . | |
| 4,022,263 | 5/1977 | Beckett et al. | 160/180 X |
| 4,322,913 | 4/1982 | Himmer | 49/360 X |
| 4,560,912 | 12/1985 | Jönsson . | |
| 4,713,545 | 12/1987 | Norrgren et al. | 49/25 X |
| 4,969,292 | 11/1990 | Reid et al. | 49/169 |
| 4,991,350 | 2/1991 | Kirk | 49/169 |
| 5,072,544 | 12/1991 | Breck, Jr. | 49/168 X |

Primary Examiner—Philip C. Kannan
Attorney, Agent, or Firm—Sheldon & Mak

[57] ABSTRACT

An automatic pet door apparatus includes a frame having a parallel-spaced pair of rigidly connected columns for mounting vertically oriented between wall studs, a lower portion of the frame defining a doorway passage between opposite sides of the walls; a door vertically movable in the frame between closed and open positions; a driver supported by the frame and coupled to the door for lifting the door from the closed position to the open position in response to a motor signal; a radiation transmitter for wearing by the pet and operable for producing a predetermined transmitter signal; a transducer located proximate the frame for producing a transducer signal in response to the transmitter signal when the pet approaches the frame from one side of the wall; and a controller responsive to the transmitter signal for activating the motor signal, whereby the door is raised by the driver, the door opening by sliding within the wall.

18 Claims, 2 Drawing Sheets

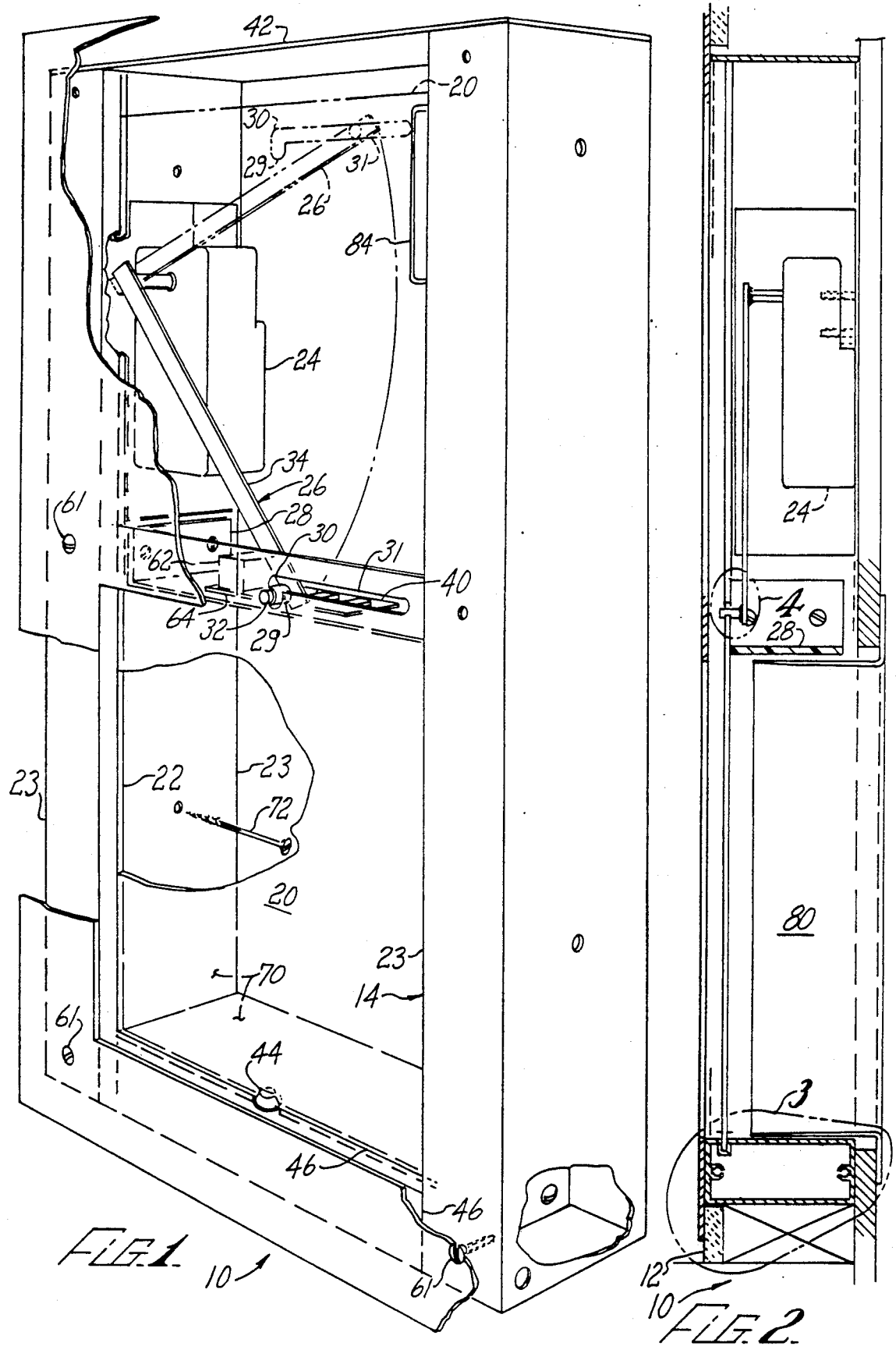

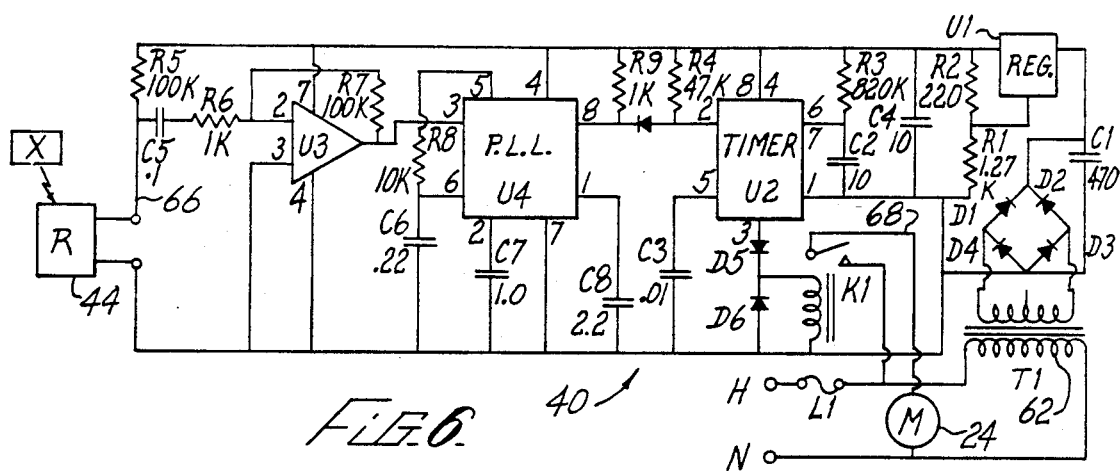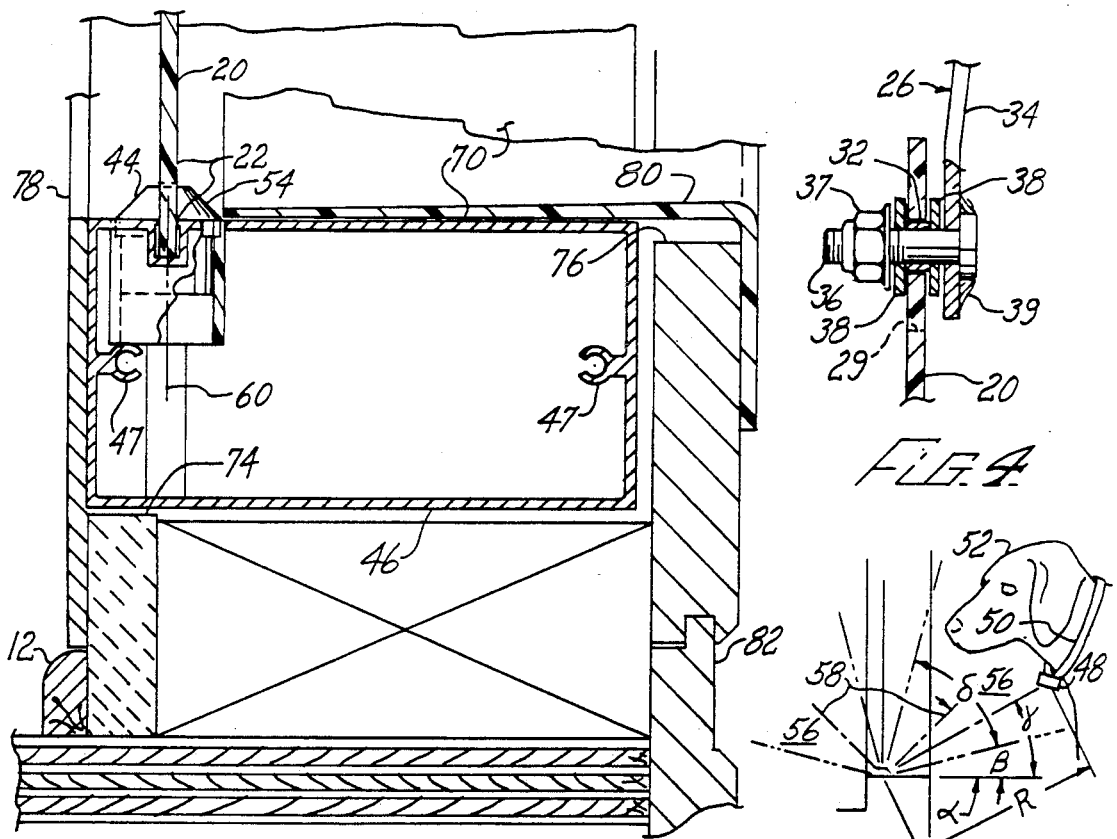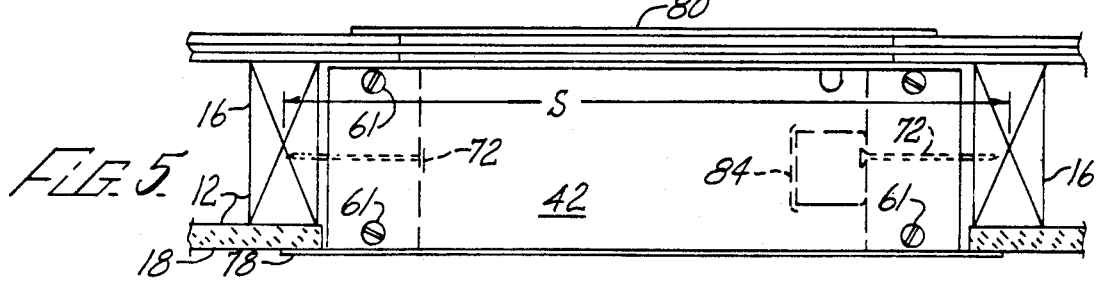

AUTOMATIC PET DOOR

BACKGROUND

The present invention relates to pet doors, and more particularly to such doors that open automatically without the pet having to physically touch or push against the door mechanism.

Pet doors available on the market today generally consist of soft plastic or aluminum materials which hang by gravity, typically from a swingably mounted utility door, and are sealed by magnetic means. Other doors have an overlapping of plastic material in such a way as to prevent excessive weather penetration. Both of these pet door devices operate by means of the pet having to push against the door or flap with its head in order to enter or exit.

A significant disadvantage of these pet doors of the prior art is that some pets (especially small pets) simply will not push against the door for one reason or another.

Most other pet doors are installed in the rear swinging door of the garage. Another disadvantage is the inconvenience of having a flap door mechanism extending from a utility door with the possibility of snagging or catching the operator.

Another disadvantage is that swinging doors of the prior art take up valuable wall space when they are opened, in addition to posing the hazards of snagging or injuring those nearby.

A further disadvantage is that the magnetic flaps or plastic materials used for weatherproofing many prior art pet doors do not match to the intended correct closed position. For this reason, installation of these conventional pet doors in the main living quarters of the house is not practical.

Moreover, conventional pet doors of the prior art also permit access to potential thieves and other animals and rodents.

Thus there is a need for a pet door that overcomes the above disadvantages, being operated without the pet having to force it open, yet being secure against thieves and is reliably weatherproof, and is inexpensive to provide and install.

SUMMARY

The present invention is directed to a automatic pet door apparatus that meets this need. The apparatus includes a frame having a parallel-spaced pair of rigidly connected column members for mounting vertically oriented between studs of the wall, a lower portion of the frame defining a doorway passage between opposite sides of the wall; a door member vertically movable in the frame between a lower closed position and an upper open position; drive means supported by the frame and coupled to the door member for lifting the door member from the closed position to the open position in response to a motor signal; a radiation transmitter for wearing by the pet and operable for producing a predetermined transmitter signal; transducer means located proximate the frame for producing a transducer signal in response to the transmitter signal when the pet approaches the frame from one side of the wall; and control means responsive to the transmitter signal for activating the motor signal, whereby the door member is raised by the drive means. As used herein, the term "radiation" is inclusive of infrared, ultraviolet, ultrasound, and electromagnetic transmissions.

Preferably the frame has a width not greater than approximately 14.25 inches for acceptance between a pair of the studs. Each column has a channel formed therein for slidably guiding the door member. The door member can be formed of a rigid translucent polymer.

The door member preferably has a smooth horizontally oriented slot formed therein for engagement by the drive means. The drive means can include an arm driven about a horizontal arm axis, and a crank pin fixably connected thereto in parallel spaced relation to the arm axis and slidably guided within the slot during operation of the drive means. The drive means can further include an electric motor operatively responsive to the drive signal and coupled through a clutch to the arm for rotation thereof about the arm axis, the clutch limiting an arm torque transmitted between the motor and the arm.

The transducer means can be responsive to the transmitter signal when the transmitter means is located at either side of the wall. The transducer means can include a transducer unit supportively located by the frame proximate a lower extremity of the passage, proximately coplanar with the door member. The transducer unit can have a vertically oriented transducer axis, being symmetrically responsive to the transducer signal on opposite sides of the transducer axis.

The transmitter signal can be concentrated within a transmitter bandwidth. The transmitter bandwidth can be within an ultrasonic frequency range. The ultrasonic frequency range can be between approximately 17 kHz and approximately 100 kHz. Preferably the transmitter operates at approximately 40 kHz.

Preferably the apparatus further includes security locking means for preventing movement of the door member upwardly from the closed position until the motor signal is activated. The security locking means can include means for lowering the door member to a rest position following deactivation of the motor signal, the drive means also having a rest position corresponding to the rest position of the door member, the rest position of the door member being below the closed position, the passage remaining closed by the door member between the closed and rest positions thereof; and a vertically oriented slot portion of the door member for preventing movement of the drive means from the rest position thereof when the door member is moved by an external force from the rest position thereof to the closed position.

The apparatus can also include a first trim member for covering a first wall opening in a first side of the wall, the frame being received into the wall through the first wall opening; a second trim member for covering edges of a second wall opening in a second, opposite side of the wall, the second wall opening being approximately aligned with the doorway passage; and means for fastening the trim members to opposite sides of the frame, whereby the drive means and the control means are concealed within the wall.

The control means can include detector means for activating the motor signal only upon reception of the predetermined transmitter signal by the transducer means, and timer means for maintaining the motor signal activated for a predetermined period of time following the activating by the detector means.

In another aspect of the invention, a door apparatus for permitting a pet to pass through the wall includes a frame for mounting to the wall, a door member movable in the frame between open and closed positions, drive means for moving the door, and control means for activating the drive means to open the door when the pet approaches the frame, whereby the door member is confined at all times between opposite sides of the frame. Thus the door member does not swing out on either side of the wall. Accordingly, the present invention avoids a danger of tripping over the door, and the door does not take up wall or ceiling space in its open position when the frame is mounted in its preferred position within the wall.

DRAWINGS

These and other features, aspects, and advantages of the present invention will become better understood with reference to the following description, appended claims, and accompanying drawings, where:

FIG. 1 is an oblique elevational perspective view of an automatic pet door apparatus according to the present invention;

FIG. 2 is a sectional side elevational view of the apparatus of FIG. 1 installed in a building wall;

FIG. 3 is an sectional elevational detail view within region 3 of FIG. 2;

FIG. 4 is a sectional elevational detail view within region 4 of FIG. 2;

FIG. 5 is a sectional plan view showing the apparatus of FIG. 1 in the wall of FIG. 2;

FIG. 6 is a schematic diagram of a control circuit of the apparatus of FIG. 1; and FIG. 7 is a side diagrammatic view of the apparatus of FIG. 1 in use with a transmitter of the apparatus being carried by a pet for actuating the apparatus.

DESCRIPTION

The present invention is directed to a pet door that provides pet owners the luxury, convenience and freedom by which their pets can accommodate their own needs anytime, day or night. With reference to FIGS. 1-7 of the drawings, a pet door apparatus 10 for a building or dwelling 12 is housed within a frame 14 that is formed of a plastic, wooden, or other suitable material (approximately 30" high and 14" wide) the frame 14 being mounted between a pair of wall studs 16 of a conventional frame wall 18 of the dwelling 12 according to the present invention, the studs 16 being standard dimensional "2 ×4" lumber measuring approximately 1.5 inches by 3.5 inches in cross-section and having a spacing S that is typically 16 inches on center as shown in FIG. 5. A door panel 20 of the apparatus 10 is housed and slides vertically within a pair of grooves or channels 22 that are formed in a spaced pair of vertically oriented column members 23 of the frame 14, the channels 22 guiding the door panel 20. The door panel 20 can be made of a transparent to translucent plastic material such as Plexiglass ®, which is commonly commercially available.

A geared motor unit 24 having an arm assembly 26 is also mounted to the frame 14 as described below for lifting the door panel 20. An L-shaped slot 30 is formed proximate the top of the door panel 20, a major leg portion 31 of the slot 20 extending horizontally to proximate one of the columns (opposite the motor unit 24) for slidably receiving a metal or plastic sleeve 32 of the arm assembly 26 as shown in FIG. 4. The sleeve 32 is fastened to an arm 34 of the arm assembly 26 by a screw or pin 36 with a nut 37 and securing washers 38 on each side of the door panel 20 as best shown in FIG. 4, the pin 36 being welded to the arm 34 as indicated at 39.

When the motor unit 24 is energized by a control module 40 as described below, the arm 34 lifts the door panel 20 upwards by means of the sleeve 32 which slides or rolls along the leg portion 31 of the slot 30. When the tip of the arm assembly 26 (or the top of the door panel 20) contacts a top plate 42 of the frame 14, the motor unit 24 is permitted to run with the arm 34 stopped by means of a clutch (not shown) that is built into the motor unit 24. After a predetermined time of a few seconds (designed into the control module 40), the motor unit 24 is de-energized, allowing the door panel 20 to close by gravity as further described below.

The motor unit 24 is activated by the control module 40 in response to a radiation detector 44 that is mounted on a base member 46 of the framework 14 when a transmitter unit 48 that is worn on a collar 50 by a dog or other pet 52 comes within range of the detector 44 as described herein, the detector 44 being electrically connected to the module 40 as described below. As best shown in FIGS. 3 and 7, the detector 44 has a frustroconically shaped receptor shell 54, an active receiver region 56 of the detector 44 radiating within a detector angle $\delta$ symmetrically above and below a cone-shaped median surface 58 that is normal to the shell 54 and extending outwardly and upwardly from the detector 44 about a vertical detector axis 60, the surface 58 being inclined upwardly from horizontal at a detector elevation angle $\alpha$ of about 45°, the angle $\delta$ being approximately 60°. Thus the receiver region 56 extends from a detector threshold angle $\beta$ of about 15° above horizontal to about 75° above horizontal ($\beta + \delta$). The detector 44 is activated when the transmitter unit 48 is elevated by a transmitter angle $\gamma$ above horizontal, within the receiver region 56, the receiver region 56 extending by a range distance R from the detector 44, symmetrically on opposite sides of the wall 18.

As further shown in FIG. 3, the base member 46 is formed with a counterpart of the channel 22 for receiving a lower extremity of the door panel 20 in its lowered or closed position, the panel 20 being notched for fitting over the detector 44. In the exemplary configuration of the apparatus 10 described herein, the column members 23 and the base member 46 are made from lengths of an aluminum extrusion, having the channel 22 formed within a thin-wall rectangular cross-section (approximately 2.0 inches by approximately 3.88 inches) that includes a pair of grooved bosses 47 for receiving suitable self-tapping fasteners 61 by which the members of the frame 14 are rigidly connected.

With particular reference to FIG. 6, the control module 40 includes a power transformer 62 for stepping down conventional 120V line power to approximately 12 volts, a diode bridge D1-D4 and filter capacitor C1 feeding a DC regulator U1 for powering a timer U2, an operational amplifier U3, and a phase locked loop circuit (PLL) U4. The transformer 62 (and other circuit components) are located on an electronic board 64 as shown in FIG. 1. Radiated waves or pulses from the transmitter unit 48 reaching the detector 44 produce corresponding activations of a transducer signal 66 for feeding the amplifier U3 through a series RC network having a capacitor C5 and a resistor R6, the pulses being conditioned as well as amplified by the amplifier U3 for driving the PLL U4, which is activated when the frequency of the transducer signal 66 is at a predetermined rate according to selected values of a resistor R8 and capacitors C6 and C7 that are connected to the PLL U4 as shown in FIG. 6. The timer U2, which can be a conventional 555-Series timer, activates a power relay K1, producing a drive signal 68 for powering the motor 24. The timer U2, which is triggered by the PLL U4 through a coupling diode D5, causes the relay K1 to be activated for a delay interval of approximately three seconds, the interval being adjustable in a conventional manner by appropriate selection of a timing resistor R3 and a timing capacitor C2.

When the pet comes within the receiver region 56, within about 12 inches from the door panel 20 as described above, with the transmitter unit 48 operating at the frequency of the PLL as also described above, the detector 44 activates the control module 40, the motor unit 24 being powered by the drive signal 68. To the extent that the motor unit 24 is powered after the door panel 20 reaches its fully raised position, the clutch permits the motor to continue operation at limited power by slipping. After the predetermined time of approximately 3 seconds (which can be adjusted and varied as needed to suit the response behavior of the pet 52), the timer U2 deactivates the relay K1, cutting off the drive signal 68. The motor unit 24, being in an open circuit, is easily driven in reverse by the arm 34, thus allowing the door panel 20 to close by the means of gravity. Should the pet 52 enter (or remain in) the receiver region 56 (approximately 12 inches from either side of the door panel 20) as the door panel 20 is closing, the detector 44 activates the motor unit 24, the door panel 20 being again raised as described above. This is a safety feature of the present invention for the protection of the pet 52, although there is little danger of injury in that the door panel 20 closes by gravity in the exemplary configuration of the apparatus 10 disclosed herein.

Another important feature of the present invention is that the door panel 20 is securely locked in its lower closed position until the motor unit 24 is activated by the control module 40. As best shown in FIG. 1, the slot 30 is formed with a downwardly extending lock portion 29 that is oriented at right angles to the leg portion 31. When the door panel 24 is in its lower closed position, resting at the bottom of the channel 22 of the base member 46, the sleeve 32 and the pin 36 are positioned within or directly above the lock portion 29. An attempted raising of the door panel 20 under these conditions causes the sleeve 32 to engage the bottom of the leg portion 29 of the slot 30, thereby preventing further lifting of the door member 20, the lock portion 29 also preventing lateral motion of the sleeve 32, thereby locking the arm assembly 26 in its lowered position. Preferably the lock portion 29, while being sufficiently long for reliably preventing the lateral movement of the sleeve 32, is sufficiently short for locking the panel 20 with its lower extremity extending partway into the channel 22 of the base member 46, thereby advantageously contributing to the security of the apparatus 10.

As shown in FIG. 1, the electronic board 64 installed above a metal or plastic bracket 28 which forms a portion of the frame 14, the bracket 28 being fastened between the column members 23 and spaced above the base member 46 for defining a passage 70 through which the pet 52 enters the dwelling 12 when the door panel 20 is in its raised or open position. The frame 14 is installed between the studs 16 of the wall 18 by means of four screws or stud fasteners 72 as shown in FIGS. 1 and 5, a first opening 74 being formed in the inside (wallboard) surface of the wall 18 for receiving the frame 14, a smaller second opening 76 being formed in the opposite (outside) surface of the wall 18, the second opening 76 roughly matching the passage 70. A trim panel 78 is fastened to the frame 14 by counterparts of the fasteners 61 for covering the rough cut first opening 74 as shown in FIGS. 1-3 and 5. A bezel member 80 is similarly fastened to the frame 14 for covering the second opening 76, the bezel member 80 also extending into the passage 70 for smoothly lining same. An important feature of the bezel member 80 is that the extension into the passage 70 accommodates studs 16 of deeper section (such as those made from "2 by 6" lumber). The trim panel 78 and the bezel member 80 can be made of a suitable plastic material such as ABS, approximately $\frac{1}{8}$" to $\frac{1}{4}$" in thickness, the bezel member 80 being formed under heating in a conventional manner. The trim moldings are fastened as described above and completely sealed around by caulking material shown in FIG. 6. If siding is lapped or grooved as indicated at 82 then more caulking will be necessary to provide a weather proof seal. The larger top portion of the trim panel 78 can accommodate the name of the pet or other decorative design. Should any mechanical or electronic portion of the apparatus 10 become faulty, the trim panel 78 can easily be removed for exposing the control module 40, the motor unit 24, the arm assembly 26, etc. as shown in FIG. 1.

Electrical power for operating the apparatus 10 is typically available in the wall 18 from electrical lines that power conventional wall plug boxes (not shown). The apparatus 10 includes a conventional junction box 84, the box 84 being fastened to an upper portion of one of the column members 23, opposite the motor unit 24, for receiving the electrical lines. Appropriate connections are provided between the junction box to the terminals L and N of the control unit 40. A shielded cable 86 extends between the control unit 40 and the detector 44, one conductor of the cable 86 carrying the transducer signal 66. The cable 86 extends within the base member 46 and one of the column members 23. In existing construction, the electrical lines can be interrupted at a counterpart of the junction box 84 that is attached to one of the studs 16, just above the first opening 74 and opposite the box 84 of the apparatus 10, an additional length of the lines being connected between the boxes 84. Alternatively, an extension cord can be connected between a nearby wall socket and the junction box 84 of the apparatus 10, the cord being brought through an appropriate opening (not shown) in the trim panel 78.

The basic frame work of the door fits neatly between the standard stud frame work of the outside of the house (studs at 16" centers).

The automatic pet door apparatus 10 of the present invention provides a number of advantages. For example:

1. It works for pets that will not push against conventional doors by opening automatically;
2. It provides a good weather seal in that the door panel 20 operated by sliding in the channels 22;
3. The combination of the transmitter unit 48 and the detector 44 with the PLL U4 prevents entrance of strange animals;
4. By providing counterparts of the transmitter unit 48 only to selected ones of a group of pets, an owner can make the door apparatus 10 available only to the selected pets;
5. The door is conveniently installed in many new and existing structures such as dwellings;

6. The door panel 20 and other moving parts of the apparatus 10 are concealed and hidden inside the wall 18 for preventing damage or harm to either the pet 52 or its owner;
7. The transparent or translucent material of the door panel 20 permits the pet 52 to see where it wants to go; and
8. The mechanism of the apparatus 10 automatically locks in the closed position of the door member 20, and unlocks only when the motor unit 24 is activated.

Although the present invention has been described in considerable detail with reference to certain preferred versions thereof, other versions are possible. For example, the pin 36 can slide directly in the slot 30 of the door panel 20. The electronics can be enclosed in an insulated container for limiting frequency drift, and a heater can be used for controlling the temperature of the container. Also, the detector 44 can be located in a transverse tube-shaped capsule entirely within the base member 46, suitable vent holes being formed in opposite sides of the frame 14 for admitting radiation, and corresponding groups of small openings being provided at corresponding locations in the trim panel 78 and the bezel member 80, the capsule excluding extraneous noise that might be produced by the apparatus 10 during operation of the motor unit 24. In this configuration, a booster amplifier can be used between the detector 44 and the phase locked loop U4 for increased sensitivity. Elastomeric members can be provided in the frame 14 for cushioning the door panel 20 at the ends of its travel. Moreover, a power switch can be provided in the primary circuit of the power transformer 62 for selectively deactivating the apparatus. Alternatively, a switch can be connected in series with the transducer signal 66 for the same purpose. Therefore, the spirit and scope of the appended claims should not necessarily be limited to the description of the preferred versions contained herein.

What is claimed is:
1. An automatic door apparatus for installation in a wall of a building structure, for permitting an authorized pet to pass through the wall, the apparatus comprising:
 (a) a frame having a parallel-spaced pair of rigidly connected column members for mounting vertically oriented between studs of the wall, a lower portion of the frame defining a doorway passage between opposite sides of the wall;
 (b) a door member vertically movable in the frame between a lower closed position for closing the passage and an upper open position for opening the passage;
 (c) drive means supported by the frame and coupled to the door member for lifting the door member from the closed position to the open position in response to a motor signal;
 (d) a radiation transmitter for wearing by the pet, the transmitter being operable for producing a predetermined transmitter signal;
 (e) transducer means located proximate the frame for producing a transducer signal in response to the transmitter signal when the pet approaches the frame from one side of the wall;
 (f) control means responsive to the transmitter signal for activating the motor signal, whereby the door member is raised by the drive means.

2. The apparatus of claim 1, wherein the frame has a width not greater than approximately 14.25 inches for acceptance between a pair of the studs.
3. The apparatus of claim 1, wherein each column of the frame has a channel formed therein for slidably guiding the door member.
4. The apparatus of claim 1, wherein the door member is formed of a rigid translucent polymer.
5. The apparatus of claim 1, wherein the door member has a smooth horizontally oriented slot formed therein for engagement by the drive means.
6. The apparatus of claim 5, wherein the drive means comprises an arm driven about a horizontal arm axis and having a crank pin fixably connected thereto in parallel spaced relation to the arm axis, the crank pin being slidably guided within the slot during operation of the drive means.
7. The apparatus of claim 6, wherein the drive means further comprises an electric motor operatively responsive to the drive signal and coupled through a clutch to the arm for rotation thereof about the arm axis, the clutch limiting an arm torque transmitted between the motor and the arm.
8. The apparatus of claim 1, wherein the transducer means is responsive to the transmitter signal when the transmitter means is located at either side of the wall.
9. The apparatus of claim 8, wherein the transducer means comprises a transducer unit, the transducer unit being supportively located by the frame proximate a lower extremity of the passage, proximately coplanar with the door member.
10. The apparatus of claim 9, wherein the transducer unit has a vertically oriented transducer axis, being symmetrically responsive to the transducer signal on opposite sides of the transducer axis.
11. The apparatus of claim 1, wherein the transmitter signal is concentrated within a transmitter bandwidth.
12. The apparatus of claim 11, wherein the transmitter bandwidth is within an ultrasonic frequency range.
13. The apparatus of claim 12, wherein the ultrasonic frequency range is between approximately 17 kHz and approximately 100 kHz.
14. The apparatus of claim 1, further comprising security locking means for preventing movement of the door member upwardly from the closed position until the motor signal is activated.
15. The apparatus of claim 14, wherein the security locking means comprises:
 (a) means for lowering the door member to a rest position following deactivation of the motor signal, the drive means also having a rest position corresponding to the rest position of the door member, the rest position of the door member being below the closed position, the passage remaining closed by the door member between the closed and rest positions thereof; and
 (b) a vertically oriented slot portion of the door member for preventing movement of the drive means from the rest position thereof when the door member is moved by an external force from the rest position thereof to the closed position.
16. The apparatus of claim 1, further comprising:
 (a) a first trim member for covering a first wall opening in a first side of the wall, the frame being received into the wall through the first wall opening;
 (b) a second trim member for covering edges of a second wall opening in a second, opposite side of the wall, the second wall opening being approximately aligned with the doorway passage; and (c) means for fastening the trim members to opposite sides of the frame, whereby the drive means and the control means are concealed within the wall.

17. The apparatus of claim 1, wherein the control means comprises:

(a) detector means for activating the motor signal only upon reception of the predetermined transmitter signal by the transducer means; and (b) timer means for maintaining the motor signal activated for a predetermined period of time following the activating by the detector means.

18. An automatic door apparatus for installation in a wall of a building structure, for permitting an authorized pet to pass through the wall, the apparatus comprising:

(a) a frame having a parallel-spaced pair of rigidly connected column members for mounting vertically oriented between studs of the wall, a lower portion of the frame defining a doorway passage between opposite sides of the wall;

(b) a door member vertically movable in the frame between a lower closed position for closing the passage and an upper open position for opening the passage, each column of the frame having a channel formed therein for slidably guiding the door member;

(c) drive means supported by the frame and coupled to the door member for lifting the door member from the closed position to the open position in response to a motor signal, the door member having a smooth horizontally oriented slot formed therein for engagement by the drive means, the drive means comprising:

(i) an arm driven about a horizontal arm axis and having a crank pin fixably connected thereto in parallel spaced relation to the arm axis, the crank pin being slidably guided within the slot during operation of the drive means; and (ii) an electric motor operatively responsive to the drive signal and coupled through a clutch to the arm for rotation thereof about the arm axis, the clutch limiting an arm torque transmitted between the motor and the arm;

(d) a radiation transmitter for wearing by the pet, the transmitter being operable for producing a predetermined transmitter signal concentrated within a transmitter bandwidth within an ultrasonic frequency range;

(e) transducer means located proximate the frame for producing a transducer signal in response to the transmitter signal when the pet approaches the frame from one side of the wall and when the transmitter means is located at either side of the wall, the transducer means comprising a transducer unit supportively located by the frame proximate a lower extremity of the passage, proximately coplanar with the door member;

(f) control means responsive to the transmitter signal for activating the motor signal, whereby the door member is raised by the drive means;

(g) security locking means for preventing movement of the door member upwardly from the closed position until the motor signal is activated;

(h) a first trim member for covering a first wall opening in a first side of the wall, the frame being received into the wall through the first wall opening;

(i) a second trim member for covering edges of a second wall opening in a second, opposite side of the wall, the second wall opening being approximately aligned with the doorway passage; and (j) means for fastening the trim members to opposite sides of the frame, whereby the drive means and the control means are concealed within the wall.

* * * * *